3,711,455
PROCESS FOR THE PREPARATION OF COPOLYMERS OF A MONOOLEFIN AND A DIOLEFIN AND THE PRODUCTS OBTAINED THEREBY

Salvatore Cucinella and Alessandro Mazzei, San Donato Milanese, Italy, assignors to Snam Progetti, S.p.A.
Filed Sept. 24, 1970, Ser. No. 75,221
Claims priority, application Italy, Sept. 24, 1969, 22,406/69
Int. Cl. C08f 1/42, 15/04
U.S. Cl. 260—85.3 R
16 Claims

ABSTRACT OF THE DISCLOSURE

A high molecular weight copolymer which exhibits crystallinity and is crosslinkable by curing is produced by reacting a monoolefin and a diolefin in the presence of a catalyst system consisting of (a) a vanadium compound of the type $V(NR_2)_4$ or $V(NR_2)_2X_2$ wherein R may be an alkyl, aryl or cycloalkyl radical and X may be a halogen, and (b) an aluminum compound of the type $AlR_xX_{3-x}$ wherein R may be an alkyl, aryl or cycloalkyl radical or hydrogen and X may be a halogen, wherein $1 \leq x \leq 2$.

---

Figure 1:
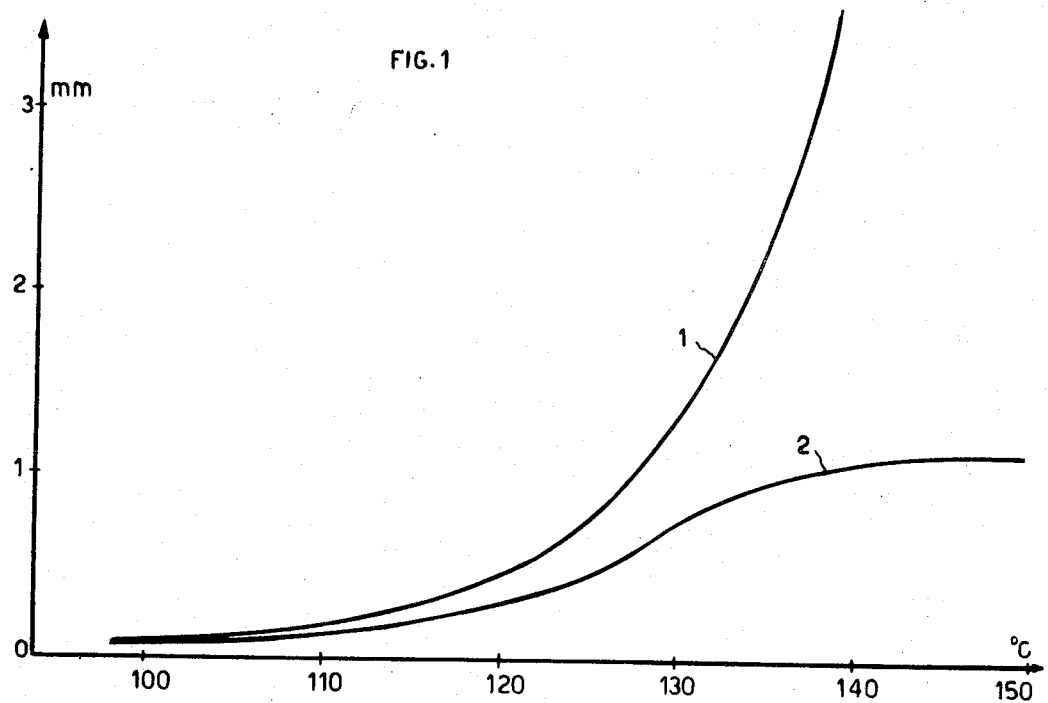

The present invention refers to a process for the preparation of copolymers of a monoolefin and a diolefin. More particularly the invention refers to a process for the preparation of copolymers of a monoolefin and a diolefin by using particular catalyst systems.

It is well known that not all the usually employed Ziegler catalyst systems are able to yield such a type of copolymerization; in fact they generally present a very different reactivity with regard to the two monomers.

It has often been claimed that mono- and diolefin copolymers have been obtained, but the obtained polymers were not real copolymers, except in some cases in which they were of a low molecular weight and a very poor composition homogeneity; moreover they were obtained as a minimum fraction with respect to the contemporaneously formed homopolymers and were not crosslinked when subjected to curing.

According to the present invention, high molecular weight copolymers are obtained which present X-rays crystallinity and which are crosslinkable by curing.

According to the process of the present invention the aforesaid polymerization is carried out by employing a catalyst comprising:

(a) a vanadium compound of the type $V(NR_2)_4$ or $V(NR_2)_2X_2$ wherein R may be an alkyl, aryl or cycloalkyl radical and X a halogen such as Cl, Br or I.
(b) an aluminum compound of the type $AlR_xX_{3-x}$ wherein R may be an alkyl, aryl or cycloalkyl radical or hydrogen and X a halogen such as Cl, Br or I, wherein $1 \leq x \leq 2$.

The molar ratio between the aluminum compound and the vanadium compound is between 2:1 and 15:1. The catalyst according to the invention does not require any aging. The polymerization is carried out in the presence of a solvent which may consist of an aliphatic, aromatic, or cycloaliphatic hydrocarbon, at a pressure ranging between one and 150 atmospheres and at a temperature in the range between −30 and 100° C.

At the end of the reaction the polymer is recovered in a conventional way, for instance by addition of an excess of methyl alcohol, containing an antioxidant, then dried before use. The monoolefin may be selected from ethylene, propylene, butene, isobutene, pentene, hexene and the like; on the other hand the diolefin may be selected from butadiene, isoprene, phenylbutadiene, pentadiene and the like. Good results have been obtained with the ethylene-butadiene mixture.

The monomers may be introduced simultaneously at the desired ratio, at the beginning of the reaction; however it is advantageous to introduce first the fixed amount of butadiene, then to inject ethylene at constant pressure for the desired reaction time. It is preferable to prepare the catalyst in the presence of both monomers.

Depending on the starting composition of the monomer mixture the butadiene unit content of the obtained copolymers, which present substantially a 1.4 trans enchainment, ranges from less than 1% to about 95%. The molecular weight of the copolymers is generally very high and depends on the amount of the reacted butadiene. In fact for the copolymers with a maximum content of about 10% by moles, the values of $[\eta]$ measured at 135° C. in decaline, vary from 12 (some percent of butadiene) to 5 (11% of butadiene). The obtained copolymers may be partially solubilized by prolonged extraction with boiling heptane.

The polymer fractions separated at different times contain both monomer units and their composition is such to justify a sufficient structural homogeneity.

The X-rays analysis of the copolymers containing prevalently ethylene reveals a higher than 40% crystallinity of the polyethylene type modified by copolymerized butadiene units present in the latex. More particularly said analysis reveals a crystallinity of the modified polyethylene type higher than 60%. Said modification involves a shift of the reflections usually observed for a highly crystalline polyethylene and particularly of the reflection 200 observed at $2\vartheta(Cu\kappa\alpha)=23.95$. A gradual shift of said angle corresponds to an increase of the butadiene content in the copolymer, and at the same time there is obtained a reduction of crystallinity according to the increasing degree of disorder caused by the random distribution of the units or small butadiene blocks along the polymeric chain. In such a case no crystallinity ascribable to long polybutadiene sequences can be observed. To the contrary, for copolymers prevalently containing butadiene units, both an X-ray crystallinity of the modified 1.4 trans polybutadiene type and the absence of crystallinity ascribable to ethylenic sequences are observed. The absence of polyethylene crystallinity has been supported by the absence of the splits of the methylenic bands in the range 13.5–14μ in the I.R. spectrum.

The crosslinking of the ethylene-butadiene copolymers according to the present invention is proved by the results of the penetration and compression tests generally carried out on copolymers having a low butadiene content ($\leq 10\%$ by mole), said results being different before and after curing.

In both cases valid evidences of the higher resistance of the copolymer after curing has been shown according to the realized vulcanization. The copolymers, having a low butadiene content, maintain unchanged, after sulfur crosslinking, the particular and excellent characteristics connected to the polyethylene matrix, at the same time presenting a higher thermal resistance.

The copolymers obtained in such a way are of particular importance for use in those fields wherein at present more expensive materials are employed, as for the coating of cables for special applications, for the manufacture of tubes for hot liquids and more generally for materials of particular resistance against hot solvents or vapors in the automotive industry and the like.

The copolymers having a high butadiene content are of considerable importance in obtaining materials presenting a remarkable resistance against oxidating agents.

The following examples serve to illustrate the invention but are not limitative thereof.

EXAMPLE 1

100 cc. of heptane containing 1.5 mmoles of

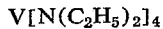

13.5 mmoles of Al(C$_2$H$_5$)Cl$_2$ were introduced into a 250 cc. stainless steel vessel. Thereafter in less than one minute, the two monomers, respectively 6 g. of butadiene and 19 g. of ethylene were added thereto.

The vessel was kept under stirring for 18 hours at room temperature, then the polymer was recovered by adding an excess of methyl alcohol containing an antioxidant, and finally dried under vacuum at 50° C. 8.5 g. of copolymer were obtained which at X-rays analysis showed 80% of crystallinity of the modified polyethylene type (reflection 200 at 2ϑ(Cu$\bar{\kappa\alpha}$)=23.91) and showed a butadiene content by mole lower than 10%.

The obtained copolymer was crosslinked by moulding at 200° C. for 30′ according to the following recipe:

| | |
|---|---|
| Copolymer | 100 |
| Antioxidant 2246 | 1 |
| Zinc oxide | 5 |
| Stearic oxide | 1 |
| NOBS special (N-ossidiethylen-benzothyarylsulfuramide) | 2.5 |
| Vulcacit DM (dibenzothyaryldisulfide) | 0.5 |
| Sulfur | 1.5 |

Thereafter penetration and compression tests have been carried out on test pieces having 6 mm. thickness comparing the behaviour of the cured polymer with the one of the same copolymer when unvulcanized. The penetration tests have been carried out with a penetration of 1 mm.$^2$ section, 1 kg. load and thermal increase of 50° C./h.

The diagram of FIG. 1, wherein the temperatures in centigrade degrees are reported in abscisse and the penetration in mm. in ordinate, shows a typical run of said tests. It is well evident the best resistance shown by the copolymer after curing, as revealed from curve 2 exactly referring to the cured copolymer.

The compression tests have been carried out by subjecting the copolymer test pieces, plunged in a silicon oil bath at a constant temperature of 150° C. to a pressure of 3.250 kg./cm.$^2$ and by measuring the flattening versus the time.

Figure 2:
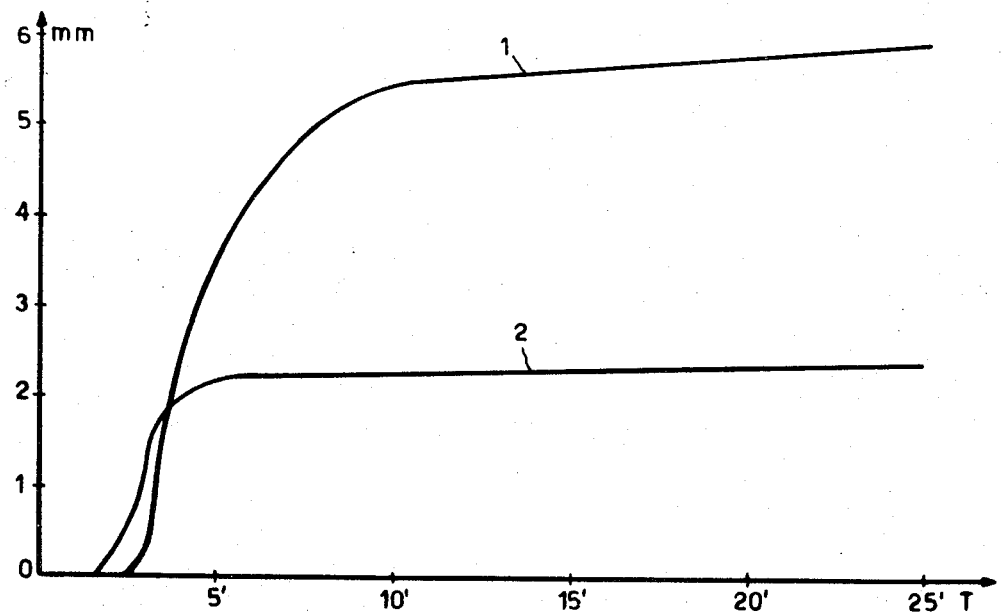

Also, in this case, as it appears from the diagram of FIG. 2, wherein the time in minutes is reported in abscisse and the flattening in mm. is reported in ordinate, a higher resistance of the copolymers is observed when subjected to curing, as it results from curve 2, where refers to the cured polymer.

EXAMPLE 2

100 c. of heptane containing 1.5 mmoles of

V [N(C$_2$H$_5$)$_2$]$_4$ 9 mmoles of Al(C$_2$H$_5$)Cl$_2$ were introduced into a 250 cc. stainless steel vessel. Then 5 g. of butadiene and 16 g. of ethylene were added, as rapidly as possible.

The vessel was kept under stirring for 18 hours at room temperature, the polymer being then recovered by adding methyl alcohol, containing an antioxidant, and finally dried under vacuum at 50° C. 7.2 g. of copolymer were obtained. It had the following characteristics: a butadiene content of 10% by moles, a crystallinity of 79% of the modified polyethylene type (reflection 200 at 2ϑ(Cu$\bar{\kappa\alpha}$) =23.84) and the butadiene units substantially as a 1.4 trans enchainment.

EXAMPLE 3

By operating in the same conditions as in the preceding example, the following amount of products have been employed:

100 cc. of heptane, 1.5 mmoles of V[N(C$_2$H$_5$)$_2$]$_4$, 9 mmoles of Al(C$_2$H$_5$)Cl$_2$, 11 g. of butadiene, 12 g. of ethylene. 5 g. of polymer have been obtained with a butadiene molar content of 15% and presenting 74% crystallinity of the modified polyethylene type (reflection 200 at 2ϑ(Cu$\bar{\kappa\alpha}$)=23.72). By extracting with boiling heptane (48 h.) 15% of polymer was extracted; in this fraction the present butadiene amounted to 13% by mole.

EXAMPLE 4

In the same operative conditions as in the preceding examples, 100 ml. of heptane were employed, which 1.5 mmoles of V[N(C$_2$H$_5$)$_2$]$_4$, 13.5 mmoles of Al(C$_2$H$_5$)Cl$_2$, and then 6 g. of butadiene and 9 g. of ethylene were added. 2.4 g. of copolymer were obtained with a molar ethylene content of 28.5% and still presenting a modified polyethylene type crystallinity.

EXAMPLE 5

The operating conditions and the catalyst amount being maintained unchanged, 20 g. of butadiene and 6 g. of ethylene were introduced into the vessel. At the end of the reaction 5.4 g. of copolymer were obtained, which polymer having a molar butadiene content of 69% and presenting a crystallinity of the modified 1.4 trans polybutadiene type. By using boiling heptane (52 h.) 30% of copolymer was extracted. In said fraction the butadiene amounted to 68% by moles.

EXAMPLE 6

100 ml. of chlorobenzene were introduced into a 250 ml. stainless steel vessel. 1.5 mmoles of V[N(C$_2$H$_5$)$_2$]$_2$Cl$_2$ and 3 mmoles of Al(C$_2$H$_5$)Cl$_2$ were added thereto. Thereafter the monomers were rapidly added, respectively 5.5 g. of butadiene and 15 g. of ethylene. The vessel was kept under stirring for eighteen hours at room temperature, then the copolymer was recovered by adding an excess of methyl alcohol, containing an antioxidant. Finally the copolymer was dried under vacuum at 50° C. 11 g. of product were obtained with a mole content of butadiene lower than 10%.

EXAMPLE 7

With the same conditions as in the preceding example, 1.5 mmoles of V[N(C$_2$H$_5$)$_2$]$_2$Cl$_2$ and 6 mmoles of Al(C$_2$H$_5$)Cl$_2$ were employed which 7 g. of butadiene and 18 g. of ethylene were added. 54.4 g. of product was obtained with a molar butadiene content of 13.5%.

We claim:

1. Process for the preparation of copolymers of a mono-olefin and a diolefin characterized in that the reaction is carried out in the presence of an inert solvent, at a pressure ranging from one to 150 atmospheres, at a temperature ranging from —30 to 100° C., and by employing a catalyst system consisting of
    (a) a vanadium compound selected from the group consisting of V(NR$_2$)$_4$ and V(NR$_2$)$_2$X$_2$ wherein R is a member of the group consisting of an alkyl radical containing a number of carbon atoms from 2 to 6, aryl and cycloalkyl radical, and X is a halogen selected from the group consisting of Cl, Br, and I,
    (b) an aluminum compound represented by the formula AlR$_x$X$_{3-x}$ wherein R is a member of the group consisting of an alkyl, aryl and cycloalkyl radical, and hydrogen and X is a halogen selected from the group consisting of Cl, Br and I, and wherein 1≤x≤2.
2. Process according to claim 1 characterized in that the vanadium compound is V[N(C$_2$H$_2$)$_2$]$_4$.
3. Process according to claim 1 characterized in that the vanadium compound is V[N(C$_2$H$_5$)$_2$]$_2$Cl$_2$.

4. Process according to claim 1 characterized in that the aluminum compound is $Al(C_2H_5)Cl_2$.

5. Process according to claim 1 characterized in that the monoolefin is selected from the group consisting of ethylene and the homologous higher olefins having up to ten carbon atoms.

6. Process according to claim 1 characterized in that the diolefin is selected from the group consisting of butadiene, isoprene, phenylbutadiene and pentadiene.

7. Process according to claim 1 characterized in that the molar ratio between the aluminum compound and vanadium compound ranges from 2:1 to 15:1.

8. Process according to claim 1 characterized in that the reaction is carried out at room temperature.

9. Process according to claim 1 characterized in that the reaction is carried out at a pressure higher than atmospheric pressure.

10. Process according to claim 1 characterized in that the inert solvent is a member of the group consisting of aliphatic, aromatic, cycloaliphatic and halogenated hydrocarbons.

11. Process according to claim 10 characterized in that the inert solvent is heptane.

12. Process according to claim 10 characterized in that the inert solvent is chlorobenzene.

13. Process according to claim 1 characterized in that the monolefin is ethylene.

14. Process according to claim 1 characterized in that the diolefin is butadiene.

15. Process according to claim 1 characterized in that ethylene and butadiene are introduced into the reaction mixture at a composition of butadiene moles ranging from 0.1 to 10%.

16. Process according to claim 1 characterized in that ethylene and butadiene are introduced into the reaction mixture at a composition of butadiene moles ranging from 10 to 95%.

References Cited

UNITED STATES PATENTS

| | | | |
|---|---|---|---|
| 3,317,496 | 5/1967 | Natta et al. | 260—88.2 |
| 3,349,064 | 10/1967 | Gumboldt et al. | 260—80.7 |
| 3,407,185 | 10/1968 | Natta et al. | 260—85.3 |
| 3,567,699 | 3/1971 | Natta et al. | 260—79.5 |

HARRY WONG, JR., Primary Examiner

A. HOLLER, Assistant Examiner

U.S. Cl. X.R.

117—161 UD; 260—29.7 UA, 79.5 P, 88.2 B